United States Patent
Le et al.

(10) Patent No.: US 7,877,599 B2
(45) Date of Patent: Jan. 25, 2011

(54) SYSTEM, METHOD AND COMPUTER PROGRAM PRODUCT FOR UPDATING THE STATES OF A FIREWALL

(75) Inventors: Franck Le, Pittsburgh, PA (US); Stefano Faccin, Dallas, TX (US)

(73) Assignee: Nokia Inc., Irving, TX (US)

( * ) Notice: Subject to any disclaimer, the term of this patent is extended or adjusted under 35 U.S.C. 154(b) by 1166 days.

(21) Appl. No.: 11/138,764

(22) Filed: May 26, 2005

(65) Prior Publication Data

US 2005/0268335 A1  Dec. 1, 2005

Related U.S. Application Data

(60) Provisional application No. 60/576,133, filed on May 28, 2004.

(51) Int. Cl.
*H04L 29/06* (2006.01)
*G06F 15/16* (2006.01)

(52) U.S. Cl. .................... 713/154; 726/11; 726/13; 709/228

(58) Field of Classification Search ............. 713/154; 726/11, 13; 709/228
See application file for complete search history.

(56) References Cited

U.S. PATENT DOCUMENTS

| | | | |
|---|---|---|---|
| 5,825,891 A * | 10/1998 | Levesque et al. ............ 713/153 |
| 6,076,168 A * | 6/2000 | Fiveash et al. ................ 726/11 |
| 6,578,151 B1 * | 6/2003 | Nilsen ......................... 726/11 |
| 7,451,234 B1 * | 11/2008 | Bonner ....................... 709/245 |
| 2003/0069016 A1 * | 4/2003 | Bahl et al. ................... 455/432 |
| 2003/0097590 A1 | 5/2003 | Syvanne |
| 2003/0118038 A1 | 6/2003 | Jalava et al. |
| 2004/0255156 A1 * | 12/2004 | Chan et al. .................. 713/201 |
| 2005/0076238 A1 * | 4/2005 | Ormazabal et al. .......... 713/201 |
| 2005/0111382 A1 * | 5/2005 | Le et al. ...................... 370/254 |
| 2005/0268335 A1 * | 12/2005 | Le et al. ....................... 726/13 |

OTHER PUBLICATIONS

Buchli, M. et al. "A Network Service Layer Protocol for QoS signaling", <draft-buchli-nsis-nslp-00>, Jun. 2003.*
Stiemerling, M. et al. "NAT/Firewall NSIS Signaling Layer Protocol (NSLP)", <draft-ietf-nsis-nslp-natfw-01>, Feb. 2004.*
Lee, S. et al. "Mobility Functions in the QoS-NSLP", <draft-lee-nsis-mobility-nslp-00>, Oct. 2003.*
Martin, M. et al. "A NAT/Firewall NSLP security infrastructure", <draft-martin-nsis-nslp-security-00>, Oct. 2003.*
International Search Report dated Nov. 18, 2005.

* cited by examiner

*Primary Examiner*—Michael J Simitoski

(57) ABSTRACT

The preferred instance of the present invention is a method and computer program product that specifies an array of elements to be incorporated into a firewall configuration protocol. When added to the configuration protocol, these added attributes allow the existing packet filtering mechanism to accommodate a terminal device that has moved and received a new IP address in a timely and efficient manner.

18 Claims, 3 Drawing Sheets

SYSTEM, METHOD AND COMPUTER PROGRAM PRODUCT FOR UPDATING THE STATES OF A FIREWALL

REFERENCE TO RELATED APPLICATION

The present application hereby makes reference to and claims priority from Provisional Patent Application No. 60/576,133, filed May 28, 2004, entitled "A System, Method, and Computer Program Product for Updating the States of a Firewall," which is further hereby incorporated within.

FIELD OF THE INVENTION

The system, method and computer program product of the present invention is directed to network access control system such as firewalls, in particular a methodology for modifying or changing the parameters, attributes or rules for the packet filtering mechanism of a firewall for providing specific, specified access for mobile terminal devices that may move in and out or around a network.

BACKGROUND OF THE INVENTION

Firewalls were developed to protect networks from unauthorized accesses. Hackers, corporate spies, political spies, and others may attempt to penetrate a network to obtain sensitive information or disrupt the functioning of the network. To guard against these dangers, firewalls inspect packets and sessions to determine if they should be transmitted or dropped. In effect, firewalls have become a single point of network access where traffic can be analyzed and controlled according to parameters such as application, address, and user, for both incoming traffic from remote users and outgoing traffic to the Internet.

Firewalls most commonly exist at points where private networks meet public ones, such as a corporate Internet access point. However, firewalls can also be appropriate in an organization's network, to protect sensitive resources such as engineering workgroup servers or financial databases from unauthorized users.

Policy based packet filtering firewalls employs a list of permissible packet types from external sources. This list typically includes information that may be checked in a packet header. The firewall checks each received packet to determine whether it meets the acceptance criteria for an incoming packet. If the packet doesn't meet the criteria, the firewall immediately rejects the packet. A similar mechanism can be provided for transmitted packets, as well.

Often, the firewall maintains the access criteria as an access control list. This access control criteria may contain network and transport layer information such as addresses and ports for acceptable sources and destination pairs. The firewall checks packet headers for source and destination addresses and source and destination ports, if necessary, to determine whether the information conforms to any of the stored access control criteria. From this, the firewall determines which packets are to be forwarded and which are to be discarded. Some extended access lists can also examine transport-layer information to determine whether to forward or block packets.

While packet filtering is considered to be significantly fast, it isn't, however, very good at handling protocols that create multiple IP addresses for mobile user devices that, typically, go in and out a networking environment. Transport Control Protocol ("TCP") and STMP (used in electronic mail) uses a similar single well-known source-destination access mechanism. For such cases, the packet filtering mechanism employs an access control list that includes the necessary elements or parameters that defines the allowed or permitted access to the network via a specific IP address. As a result, these IP addresses, never changes, the access control lists is initially set and left unchanged throughout the life of the firewall. Therefore, the packet filtering mechanism is static and as such, must either block all use of this protocol or allow all use, regardless of IP addresses. This represents a significant limitation of packet filtering mechanisms.

Fundamentally, there are two approaches that can be suggested for solving the problem of updating the attributes used to generate the packet filters of a firewall that permits the opening and removing or closing of "pinholes" that supports a plurality of mobile terminal devices moving in and out or around a network. One approach is to have a mobile terminal initiate a configuration protocol that closes the pinholes for a particular IP address of a terminal device that is moving to another portion of the network and then creates the filtering parameters for the pinholes of a new IP address when that terminal device "reenters" the network again. Thus, if there are a significant number rules or attributes associated with a set of corresponding packet filters or "pinholes", the terminal device must close these "pinhole" before it can generate a new set of rules to open a new set of packet filters or "pinholes" that are associated with a new IP address. As a result, the closing, generating a series of new packet filters or "pinholes" and installing a series of new rules appropriate for these new packet filters or "pinholes" might take an inordinately length of time which, in turn, might cause incoming packets to be dropped and discarded. More specifically, in Transport Control Protocol ("TCP") networking environments, packet filters are typically used to inspect and verify the validity of the TCP sequence number of incoming packets, closing existing "pinhole" and opening new "pinholes" may cause some synchronization problems between the TCP sequence number found in the packets and in the firewall. As a result, these incoming packets may be dropped during that time.

Therefore, the need has been recognized by a number of standards organizations such as the Internet Engineering Task Force (IETF) that has specified the parameters and attributes for several of the Internet protocols. One such protocol defined is called the Middlebox Communications Architecture (MIDCOM) that allows application servers (AS) to "open and remove" pinholes, creating a particular packet filter having the appropriate attributes so that the packets, for example, containing such elements as an audio/video data stream or application content is able to pass through the firewall and be delivered to a specific user residing on the network. However, the MIDCOM approach relies on application servers to "create and remove" pinholes rather than the user who is, typically, the only one that understands the detail needed for such communications. In other words, a server may not know all the attributes for a particular set of pinholes or packet filters required to receive a specified stream of packets, and as a result, the firewall is not configured properly. As a consequence, the characteristics of the incoming packets (IP/TCP header) do not match the pinholes and as a result the received packets are discarded.

Due to the development of new applications such as VoIP (Voice over IP), there is a requirement to create a new approach or means of modifying, creating or re-defining the packet filtering mechanism of a network firewall. Therefore there is a requirement for a technique that allows the opening and closing access to a network by efficiently creating the rules that can be used to generate new packet filters or "pinholes" in a firewall that permits delivery of such things as a video/audio stream, for example. Without the ability of dynamically changing the specific parameters or attributes in the packet filtering methodology of a firewall, inbound packets containing desired data or application content might be disposed of right at the firewall.

For the above and other reasons, it would be desirable to have an improved mechanism by which the parameters or attributes of the packet filters of a firewall can be updated or modified to accommodate the requirements of mobile user.

SUMMARY OF THE INVENTION

To overcome the limitations described above, and to overcome other limitations that will be apparent by reading and understanding the present application, the preferred embodiment of the present invention is directed to a system, method and computer for modifying or changing the parameters, attributes, parameters or rules for the packet filtering mechanism of a firewall in order to provide specific, specified access for mobile terminal devices that may move in and out or around a network.

BRIEF DESCRIPTION OF THE DRAWINGS

The accompanying figures best illustrate the details of the apparatus, system, method, and computer program product for implementing remote client integrity verification for improving network safety.

DETAILED DESCRIPTION OF THE INVENTION

Figure 1:
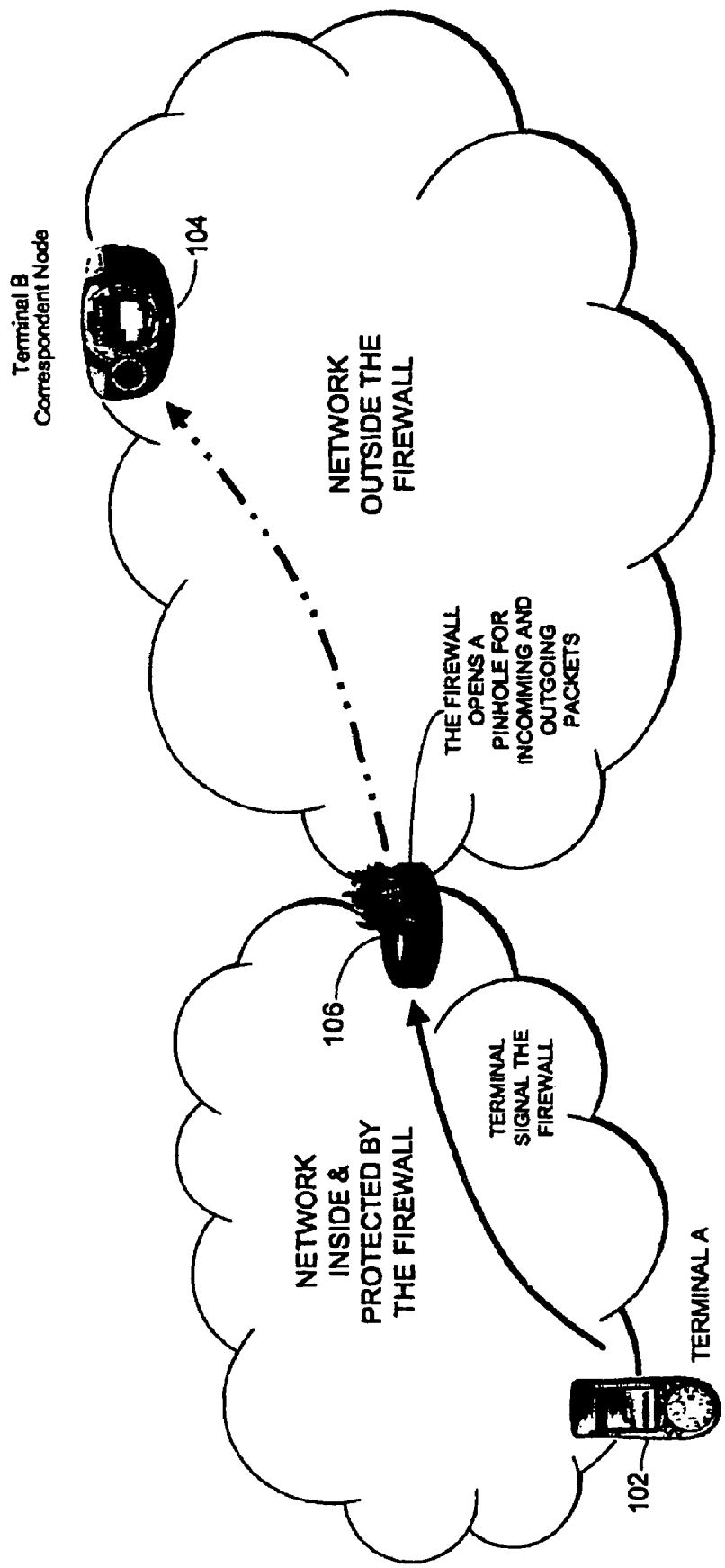
FIG. 1 is a diagram that depicts a conceptual view of a typical network.

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

To meet the requirement of allowing "user or terminal devices" that move around the network and change IP addresses, working groups of the IETF are currently specifying a new networking concept called "Next Steps in Signaling (NSIS)." The purpose of this new conceptual approach is to overcome the obstacles posed by a plurality of security appliances such as firewalls and network address translators that are used to extend IP address space so that many of the new video/audio and content specific applications can travel across a network. To that end, a path-coupled configuration protocol has been specified that defines a means of changing the attributes or parameters for packet filtering in a firewall as well as the methodology of creating network address maps along the data path in order for a data packet to easily pass through these devices to its destination.

More specifically, the configuration protocol defines a methodology of efficiently communicating between various endpoints in a network even in presence of both firewalls and network address translators. For the purposes of simplicity, this discussion will focus on, but is not limited to, policy-based firewalls where the firewall filters and forwards the incoming data packets in accordance to these specified rules or polices. Here, the configuration protocol generates and installs a series of policy-based rules for each firewall in the network. These rules are the "building blocks" that bind a series of conditions with a set of actions to define how the packet filtering mechanism of a firewall will operate processing incoming as well as outgoing data packets. Typically, packet filtering rules will consist of five fundamental attributes that includes source IP address, destination IP address, transport protocol, source port number, and destination port address that invokes one of three actions; drop, pass or log. Therefore, a firewall makes decisions about letting inbound or outbound packets pass through, or to discard the packet or log the packet based on the set of filtering rules that has been installed by the configuration protocol.

FIG. 1 is a block diagram that depicts a typical networking environment in that at least one firewall may be utilized. FIG. 1 shows a network configured to include a terminal device A 102, and a terminal device B 104, and a firewall 106. As shown in FIG. 1, terminal device 102 has been configured behind firewall 106. Consider applications such as Voice over IP, for example, where terminal device A 102 initiates a Voice over IP call across the firewall 106 to terminal device B 104. In addition, terminal device A 102 indicates that it will communicate to terminal device B 104 via a transport protocol such as UDP through ports 134 and 135. Therefore, terminal device A 102 signals the firewall 106 via the configuration protocol the following packet filtering rules:

| | |
|---|---|
| Source IP address: | IP [address of] B |
| Destination IP address: | IP [address of] A |
| Transport protocol: | UDP |
| Source Port Number: | 134 |
| Destination Port Number: | 135. |

Upon receipt, the firewall 106 initializes the packet filtering mechanism to let the incoming media stream pass through the firewall 106 and be received by terminal device A 102. This is commonly called a "pinhole." A pinhole is a term of art that designates a packet filter rule in the firewall that lets desired traffic pass through the firewall. Unfortunately, this approach only addresses the problem of allowing a terminal device to open one or more pinholes, as required to receive a specified packet or series of packets and then to close them. It does not address the requirement that allows the opening and closing access through a firewall by dynamically changing the specific parameters or attributes of the packet filtering mechanism of the firewall to accommodate both inbound and outbound data packets containing desired data or application content might be discarded right at the firewall from terminal devices that move in and out or around the network and might change IP addresses.

Figure 2:
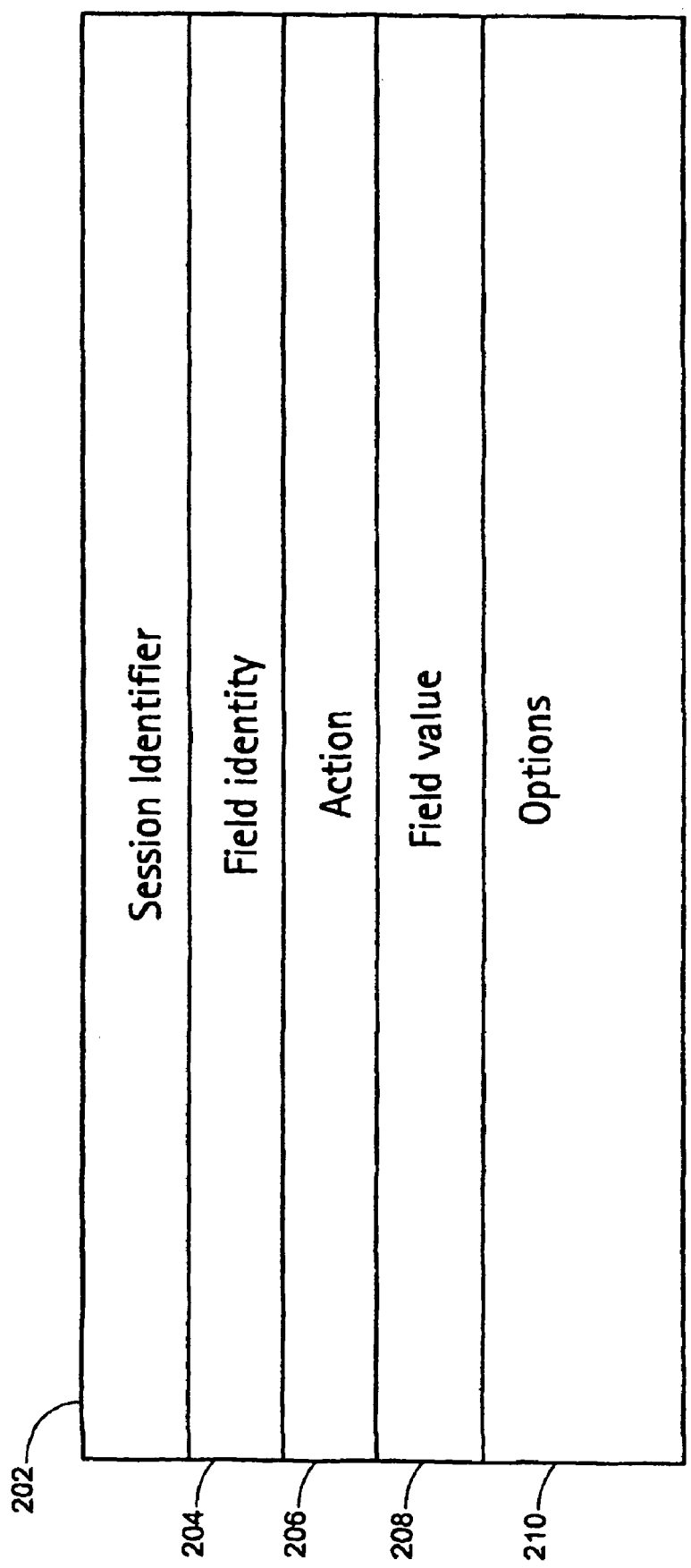
FIG. 2 is a block diagram that shows the key parameter that has been incorporated to the firewall configuration protocol in accordance with an embodiment of the present invention.

To address these requirements, the preferred embodiment of the present invention specifies an array of elements to be incorporated into a firewall configuration protocol. When added to this configuration protocol, these added attributes allow the existing packet filtering mechanism to accommodate a terminal device that has moved and received a new IP address in a timely and efficient manner. FIG. 2 shows the key attributes that have been incorporated to the configuration protocol to include a session identifier 202, a field identifier 204, action field 206, field value 208, and an options field 210. The session identifier 202 recognizes the set of filter by either session ID or IP address while the field identifier 204 is used to indicate what packet filters are to be updated or modified followed by the action field 206 that is used to define what is required to be done such as substituting one or more filtering attributes or to discard existing filter and create a new packet filter with new attributes. The field value attribute 208 is designed to carry the new value or values used to modify and or update the packet filter while the options field 210 is designated to carry any additional information or requirements. For example, the options field can be used for such things as a proof of ownership thus if a terminal device changes IP address, it should prove, in some way a token, signature or some other method that the terminal device owns the IP address it wants to update. This will then trigger an action by the terminal device to show ownership of the IP address by a certificate, a signature (e.g. CGA) or a token provided by the network when the IP address was assigned to the device. Another potential use might be to show proof of ownership by a terminal device of an existing IP address. Thus, if the terminal device changes IP address, it should show in some way a token, signature or some other method that the terminal device owns the IP address indicated. In order to show ownership of an IP address, the terminal device can send a signature, a token or even perform a cookie exchange making sure that the claimed IP address provided by the visited network has been assigned to that terminal device Upon receipt of the message utilizing this enhanced version of the configuration protocol the firewall will verify the authenticity of the message examining the message to verify that the terminal device owns the indicated fields and that those fields are to be updated by inspecting some form of ownership. If all these verifications are complete and accurate, the firewall will update or change the state of the packet filtering mechanism based on the information generated by the added elements of the configuration protocol in accordance with the present invention.

Figure 3:
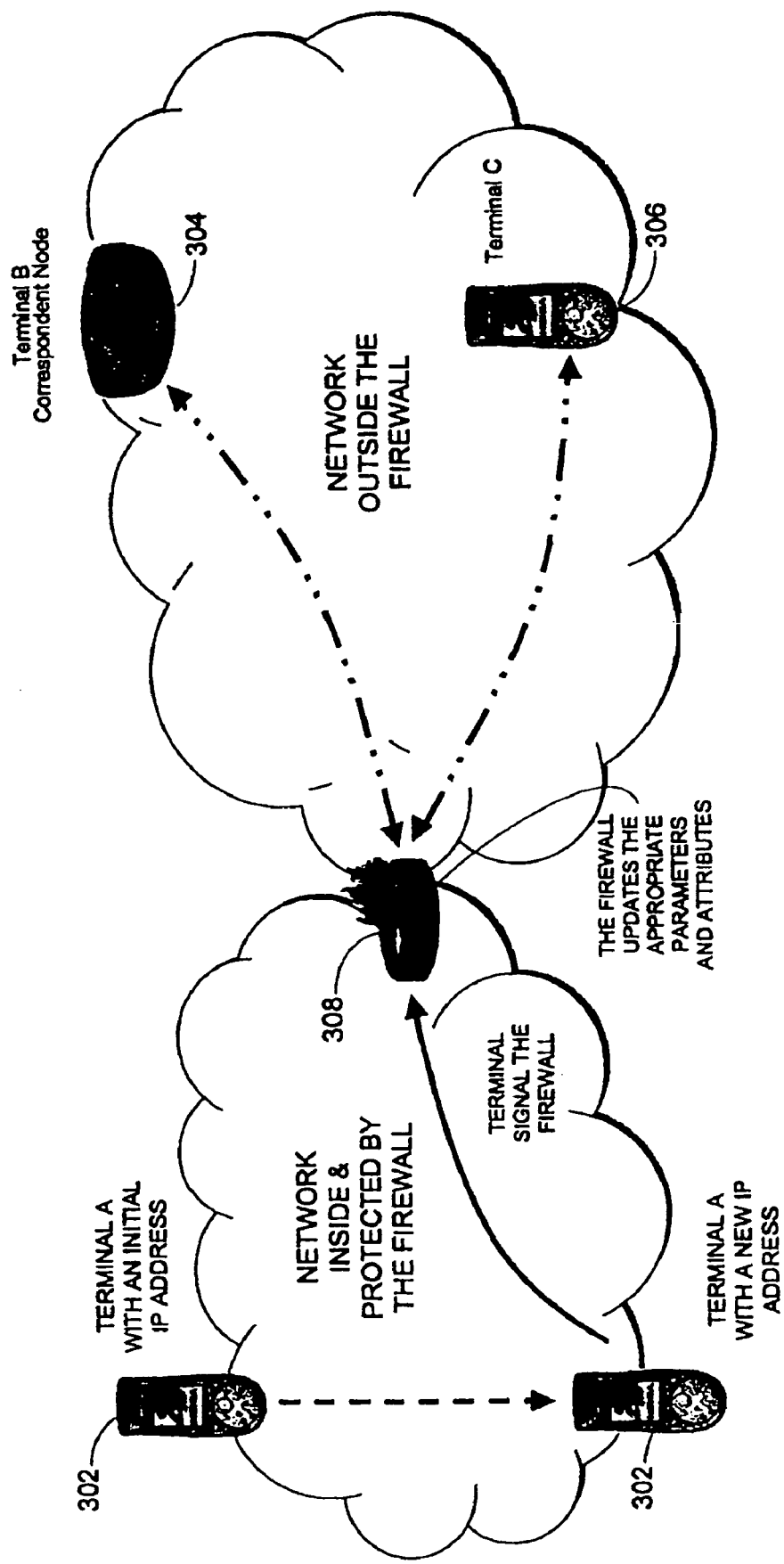
FIG. 3 is a diagram that depicts a conceptual view of network that includes wireless terminal devices in accordance with an embodiment of the present invention.

Reference is now made to FIG. 3 that depicts a conceptual view of a network that includes wireless terminal devices in accordance with an embodiment of the present invention. As shown in FIG. 3 terminal device A 302 is protected by firewall 308 and correspondent terminal device B 304 is positioned outside the network. Here, the firewall is configured with a set of packet filtering rules or attributes that includes dropping any incoming ICMP packets, allowing any incoming traffic through agreed ports 123 and 124 from correspondent terminal device B 304, allowing any incoming traffic through agreed ports 154 and 155 from correspondent terminal device C 306, the fourth is to accept incoming traffic from any node at port 80 and the last rule is designed to have the firewall block any other incoming traffic to the network. As a result, terminal device B 304 is able to communicate with Terminal A 302 through source port 123 and destination port 124 while terminal device C 306 is able to communicate with Terminal A 302 through source port 154 and destination port 155 and terminal device A 302 is able to receive traffic via port 80.

As FIG. 3 shows terminal device A 302 moves to a different subnet and changes IP address from IP1 to IP4, terminal device A 302 informs its corresponding device, namely terminal device B 304 and C 306 of the change in IP address. But the filter rules in the firewall, however, have not been changed or been updated, which create a problem, for example, if terminal device B 304 transmits a series of data packets to terminal device 302 with a destination IP address of IP4, the firewall will be unable to match any of the filter rules other than the fifth rule and as a result, the data packets transmitted from terminal device B 304 will therefore be dropped. This also applies to data transmitted by terminal device C 306, as well. Thus by utilizing the expanded version of the signaling or configuration protocol in accordance with the preferred embodiment of the present invention the session identifier, a field identifier, action field, field value and even the options field to update the packet filters of the firewall, any incoming packets that match the newly revised and installed filtering rules will be permitted to be exchanged between devices.

It should be emphasized that although illustrative embodiments have been described herein in detail, that the description and drawings have been provided for purposes of illustration only and other variations both in form and detail can be added thereupon with departing from the spirit and scope of the invention. The terms and expressions herein have been used as terms of description and not terms of limitation. There is no limitation to use the terms or expressions to exclude any equivalents of features shown and described or portions thereof.

What is claimed as new and desired to be protected by Letters Patent of the United States is:

1. A method for use in managing a communication, comprising:
    changing, by a first computing device, at least one of a network address or a port number;
    determining a session identifier that identifies a filtering mechanism to update in a security device;
    determining a filter identifier that identifies an existing filter rule within the filtering mechanism to update;
    determining an action to be performed on the filter rule;
    determining a value attribute with which to update the filter rule;
    generating a message, wherein the message includes the session identifier, the filter identifier, the action, and the value attribute; and
    providing the message to the security device to enable a dynamic update of the filter rule such that the security device is configured to allow the first computing device to communicate with a second computing device while the first computing device changes at least one of a network address, or a port number,
    wherein at least a portion of the communication is routed to the security device.

2. The method of claim 1, wherein the message further includes an indication of ownership associated with the first computing device.

3. The method of claim 1, further comprising:
    providing, with the message, an indication of ownership of the message; and
    when the first computing device changes at least one of the network address or port number, providing to the security device the indication of ownership.

4. The method of claim 3, wherein the indication of ownership further comprises at least one of a token, a signature, a cryptographically generated address (CGA), or a cookie.

5. The method of claim 1, wherein the security device employs the message to update the filtering mechanism by updating a packet filtering rule, the packet filtering rule enabling at least one of a drop, a pass, or a log action.

6. The method of claim 1, wherein the filtering mechanism employs a policy-based rule.

7. The method of claim 1, wherein the message further comprises at least one of a source IP address, destination IP address, transport protocol, source port number, and a destination port address.

8. The method of claim 1, wherein the action indicates a substitution of one or more filtering rules.

9. The method of claim 1, wherein the security device is at least one of a firewall or a network address translator.

10. A method for use in managing a communication over a network, comprising:
    changing, by a first computing device, at least one of a network address or a port number used to communicate over the network;
    determining a plurality of attributes associated with an update to an existing filter in a security device for use in managing the communication between the first computing device and a second computing device, the attributes including a session identifier, a filter identifier, an action to be performed on the filter and a value attribute, at least a portion of the communication being routed to the security device; and
    providing the plurality of attributes to the security device, wherein the security device employs the attributes to dynamically update the filter such that the security device is configured to maintain the communication between the first and second communications devices while the first computing device changes a network location.

11. The method of claim 10, wherein the plurality of attributes further comprises at least one of a session identifier that identifies the filter to update, a filter identifier that identifies a filter rule within the filter to update, an action to be performed on the filter rule, and a value attribute with which to update the filter rule.

12. A system for use in managing an update to a security device comprising:
    a transceiver for receiving and sending content over the network;
    a processor in communication with the transceiver; and
    a memory in communication with the processor and for use in storing data and machine instructions that cause the processor to perform a plurality of operations, including:
        changing at least one of a network address or a port number associated with a first computing device and used by the first computing device to communicate over the network;
        generating a message, wherein the message comprises:
            a session identifier that recognizes a set of filters within the security device,
            an indicator of an existing packet filter within the set of filters to update,
            an action performable on the packet filter; and
            a value useable to update the indicated packet filter; and
        providing the message to the security device to dynamically update the security device so as to allow the first computing device to communicate with a second computing device while the first computing device changes a network location, the communication being routed to the security device.

13. The system of claim 12, wherein providing the message includes providing the message to the security device to dynamically update the security device so as to allow a first computing device to communicate over a wireless network.

14. The system of claim 12, wherein to allow a first computing device to communicate with a second computing device further comprises at least one of enabling an initial communication or maintaining an existing communication while the dynamic update is performed.

15. The system of claim 12, wherein the processor and machine instructions are included within the first computing device.

16. The system of claim 12, wherein the message further comprises an options field that includes a proof of ownership that associates the message to the first computing device, and wherein the proof of ownership further comprises at least one of a token, a certificate, a cookie, or a signature.

17. A system for use in updating a state of a security device, comprising:
    a mobile terminal that is configured to perform actions, including:
        establish a communication, via a security device, with a second computing device, wherein the communication employs at least one of a network address or a port number associated with the mobile terminal;
        changing at least one of the network address or the port number associated with the mobile terminal;
        determining a plurality of attributes associated with an update to the state of the security device to manage the communication between the mobile terminal and the second computing device, at least a portion of the communication being routable to the security device; and
        providing a message including a session identifier, a filter identifier of an existing filter, an action to be performed on the filter and a value attribute to the security device; and
    the security device being in communication with the mobile terminal and configured to perform actions, including:
        receiving the message including the plurality of attributes, employing an enhanced configuration protocol that allows the security device to accommodate a change in the mobile terminal's network address;
        verifying an authenticity of the message by confirming that the mobile terminal owns the message; and
        if the message is verified, dynamically updating the state based on information within the message including the plurality of attributes, to allow the mobile terminal to maintain the communication with the second computing device while the mobile device changes a network location and at least a portion of the communication is routed to the security device.

18. An apparatus useable in managing an update to a security device comprising: a transceiver for receiving and sending content over the network;
    a means for changing at least one of a network address or a port number associated with a first computing device;
    a means for determining a message, wherein the message comprises: a session identifier indicating a set of filters within the security device, an indicator of an existing packet filter with the set of filters to update, an action performable on the packet filter; and a value useable to update the indicated packet filter; and
    a means for providing the message to the security device to dynamically update the security device and allow the first computing device to communicate with a second computing device while the first computing device changes a network location, the communication being routed to the security device.

* * * * *